(12) United States Patent
Perkins et al.

(10) Patent No.: US 12,236,443 B2
(45) Date of Patent: Feb. 25, 2025

(54) SYSTEM AND METHOD FOR DETERMINING USER ENGAGEMENT WITH AN APPLICATION

(71) Applicant: VERIZON PATENT AND LICENSING INC., Basking Ridge, NJ (US)

(72) Inventors: Kevin Perkins, Wildwood, MO (US); Ashwini Kumar Kounduri, Redmond, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 223 days.

(21) Appl. No.: 18/161,199

(22) Filed: Jan. 30, 2023

(65) Prior Publication Data
US 2024/0257161 A1    Aug. 1, 2024

(51) Int. Cl.
G06Q 30/0201    (2023.01)
G06F 9/54       (2006.01)
H04L 43/04      (2022.01)
H04L 67/50      (2022.01)

(52) U.S. Cl.
CPC ......... *G06Q 30/0201* (2013.01); *G06F 9/547* (2013.01); *H04L 43/04* (2013.01); *H04L 67/535* (2022.05)

(58) Field of Classification Search
None
See application file for complete search history.

(56) References Cited

U.S. PATENT DOCUMENTS 8,811,224 B2 * 8/2014 Arkin ............... H04L 41/12
                                                709/224
2022/0107799 A1 * 4/2022 Wu ................. G06N 20/00

* cited by examiner

*Primary Examiner* — Quang N Nguyen

(57) ABSTRACT

In the various embodiments, systems and methods are disclosed for determining user engagement with an application based on network traffic data corresponding to network traffic on a network. An aspect of the present disclosure is a method comprising obtaining network traffic data for a period of time, the network traffic data including a plurality of host calls; determining a host call sequence from the plurality of host calls, the host call sequence including one or more of the plurality of host calls; identifying an application corresponding to the host call sequence based on an augmented dataset; and determining a number of users of the application for the period of time based on a number of times the host call sequence repeats in the network traffic data.

17 Claims, 7 Drawing Sheets under the user engagement or usage of applications and
SYSTEM AND METHOD FOR DETERMINING USER ENGAGEMENT WITH AN APPLICATION

BACKGROUND

Currently, third-parties and content producers mainly rely on self-reporting figures from application developers to determine user engagement or usage of applications and programs. Such self-reporting is susceptible to subjective interpretations by the reporting party and can lead to undercounting or overcounting of user engagement. However, user engagement can be determined by analyzing network traffic from applications or programs to network hosts.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
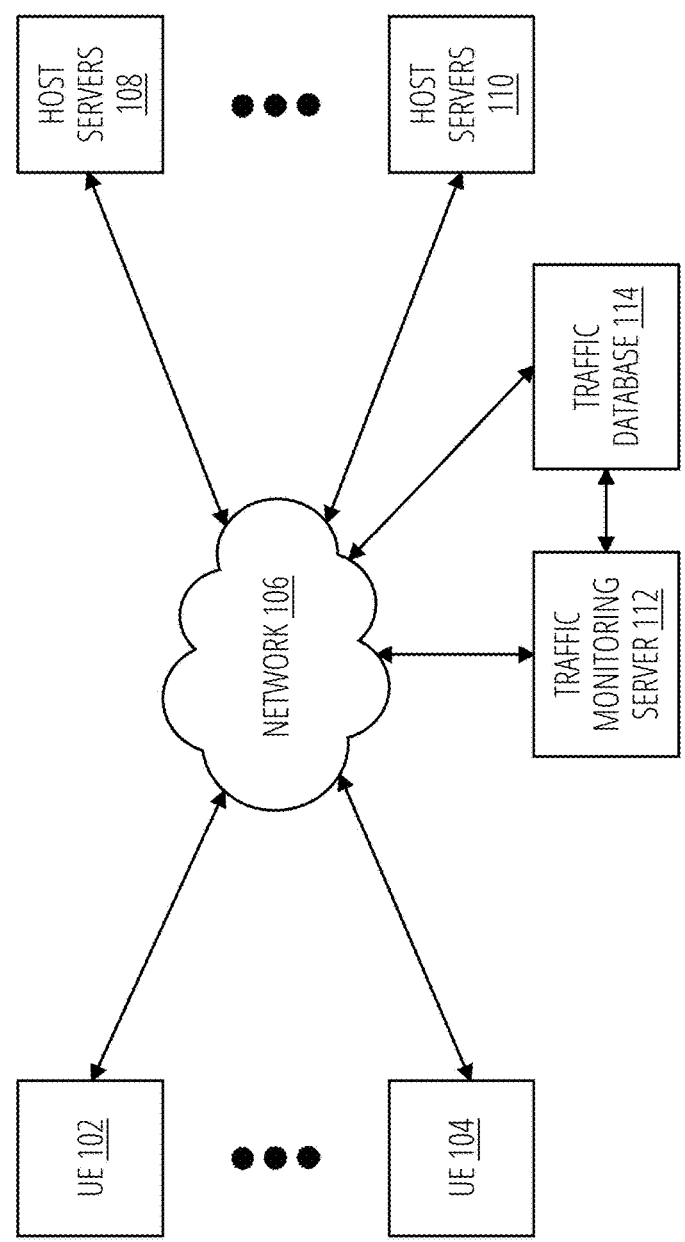
FIG. 1 is a block diagram illustrating an example environment within which the systems and methods disclosed herein could be implemented according to some embodiments.

User engagement with an application is an important metric for resource allocation by third-parties such as network operators (NOs). Similarly, content providers and advertisers use user engagement as the basis for many technical and commercial agreements with application developers and publishers. Generally, user engagement is self-reported by the application developer or publisher. This paradigm creates a conflict of interest for the reporting party and can lead to undercounting or overcounting of application usage.

As used herein, user engagement refers to the number of users that interact with a given application. In some embodiments, user engagement can represent the number of users interacting with an application in predetermined period of time (e.g., number of daily or monthly users). In some embodiments, user engagement can refer to the number of Daily Active Users (DAUs) of an application.

In the various embodiments, systems and methods are disclosed for determining user engagement with an application (or "App" used interchangeably) based on network traffic data corresponding to network traffic on a network. In some embodiments, user engagement can be determined by analyzing network requests from applications (e.g., a browser, mobile application, and the like) to specific hosts—otherwise known as host calls. As an example, in some embodiments, a user can interact with a client, such as a web browser on a device, to access a website. Then, the client can make a Hypertext Transfer Protocol (HTTP) host call to the host server where the website is hosted. In turn, the server can process the request and return the requested information to the client. In some embodiments, this can allow the client, for example, to access and display the website on the user's device.

In the various embodiments, a host call can refer to a request made by a device (e.g., User Equipment (UE)) to a host computer or other network device (e.g., a host server) to establish a connection or otherwise exchange information. In some embodiments, a host call can include host call parameters (or arguments used interchangeably). In some embodiments, host call parameters can include the destination address (e.g., hostname or domain) of the server that the host call is being made to, the port number that the host call is being made to, the type of request being made (e.g. GET, POST, PUT, etc.), the protocol being used (e.g. HTTP, HTTP Secure (HTTPS), File Transfer Protocol (FTP), etc.), the content type of the request (e.g. text/html, application/json, etc.), the data or payload being sent with the request, authentication or authorization information (e.g. username and password), headers or metadata associated with the request, or a combination thereof.

In the various embodiments, network traffic data can include data and metadata corresponding to host calls and/or host call parameters. In some embodiments, data and/or metadata corresponding to host calls and/or host call parameters can include a user identifier, a timestamp, and/or a destination address. In some embodiments, the user identifier can include a username and/or a mobile phone number (or a hash thereof). In some embodiments, the destination address can include a hostname, a domain, and/or a Uniform Resource Locator (URL). In some embodiments, the timestamp can indicate when the host call was initiated by the UE (e.g., UE 102-104 as described in relation to FIG. 1), received by a traffic monitoring server (e.g., traffic monitoring server 112), or received by a host server (e.g., host servers 108-110).

In the various embodiments, network traffic data generated as a result of user interaction with a device can be referred to as interaction data. In some embodiments, interaction data can include data and metadata corresponding to host calls (and/or corresponding host call parameters) generated by applications implemented on user devices as a result of an interaction by the user with the application. For example, in some embodiments, interaction data can include the host calls generated from UE in relation to the websites that a user visits and the actions that the user takes on those websites. In some embodiments, interaction data can be generated and/or gathered by the UE tracking user interactions with different applications and later communicating such interaction data to traffic monitoring server (e.g., traffic monitoring server 112). In some embodiments, the user interaction tracking can be accomplished by a secondary application from the target application. In some of these embodiments, interaction data can include user interactions with specific icons, media, or content within an application and any associated host calls. In some of these embodiments, interaction data can include the location of a mouse click or a touch in a touch screen and any associated host calls. In some embodiments, interaction data can include keyboard or other user interface (UI) behavior and any associated host calls.

In some embodiments, an application being used by a user can be identified from a single host call or from a sequence of host calls. In some embodiments, a host call sequence can include one host call or a plurality of host calls. In some embodiments, a host call sequence can include a plurality of successive host calls. This process can be referred to as application (App) inference. For example, in an embodiment, where the domain xxx.sampledomain.com is only called by or otherwise associated with App A, it can be inferred that every occurrence of xxx.sampledomain.com in network traffic data corresponds to a user interacting with App A. In some embodiments, network traffic data can be analyzed over a period of time to identify the number of host calls including xxx.sampledomain.com. From the number of occurrences of xxx.sampledomain.com, the number of users interacting with or otherwise using App A for that period of time can be determined. As another example, in an embodiment, App B may call or otherwise be associated with a sequence of hosts calls including [xxx.sampledomain.com, yyy.sampledomain.com, zzz.sampledomain.com]. In some of those embodiments, from the number of occurrences of the sequence including [xxx.sampledomain.com, yyy.sampledomain.com, zzz.sampledomain.com] in the network traffic data, the number of users using or otherwise interacting with App B can be inferred.

In some embodiments, the relationship between a given application and a host call sequence can be predetermined. That is, in some embodiments, a given application can have one or more associated host call sequences (referred to herein as an App-host call sequence combination) that can be used to identify the App. In some embodiments, an App-host call sequence combination can be determined through a fingerprinting process. As used herein, fingerprinting host calls in network traffic refers to the process of identifying and tracking specific applications, devices or users on a network by analyzing their network traffic. In some embodiments, this can be done by examining the characteristics of the host calls made by the devices or users, such as the type of device, the type of request, or any other parameter in the host call.

In some embodiments, fingerprinting an application can include recording the host calls stemming from the application as a human reviewer interacts with the application. This process can be generally referred to as manual fingerprinting. In some embodiments, during manual fingerprinting of an application's host calls, a human reviewer interacts with different elements of a graphical user interface of an application. Then, in some embodiments, the application can generate one or more host calls in response to the user's input (e.g., fetching a website from a host server). In some embodiments, a traffic analyzer (e.g., traffic monitoring server 112) can intercept and analyze the network traffic generated by the application as it makes these requests. In some embodiments, this can be achieved by implementing a network sniffer or other monitoring tool. In some embodiments, the traffic analyzer can inspect the traffic directly on the device or over the network.

In some embodiments, manual fingerprinting can be used to create a baseline dataset including applications and corresponding host call sequences (e.g., an App-host call sequence combination). In some embodiments, the baseline dataset can include a plurality of host call sequences for a given application. In some embodiments, the baseline dataset can include data or metadata regarding a user or device initiating the host calls. In some embodiments, the baseline dataset can include data and/or metadata corresponding to each host calls (and/or corresponding host call parameters, if existing) in a host call sequence.

In some embodiments, the baseline dataset can be created through manual fingerprinting. In some embodiments, the baseline dataset can be created by some other process, known or to be known, without departing from the scope of the present disclosure. In some embodiments, determining every possible App-host call sequence combination through fingerprinting alone can be time and resource intensive and may not capture all possible combinations. In some embodiments, a given application may call different hosts interchangeably upon the same interaction with the application by a user. For example, in some embodiments, a given application might call different hostnames based on a geographical location of the device implementing the application or a geographical location assigned to the user upon the same interaction by the user with the application in different geographical locations. In another example, an application may call different hosts for a same interaction by the user based on host availability. In those embodiments, the application may call specific hosts interchangeably (e.g., xxx.sampledomain.com and yyy.sampledomain.com) in a given host call sequence. Following the foregoing examples, in some embodiments, the baseline dataset may not include the interchanged hosts because the fingerprinting process was performed in one geographical location and not another, by one specific user and not another, or a given host was not available at the time of interaction, respectively.

In the embodiments described herein, systems and methods are disclosed for augmenting a baseline dataset including App-host call sequence combinations. In some embodiments, the systems and methods disclosed herein can generate an augmented dataset based on the baseline dataset. In some embodiments, augmenting the baseline dataset can include determining, using a novel host interchangeability model, additional host call sequences that may be associated with a specific application in an App-host call sequence combination. In some embodiments, augmenting the baseline dataset can include determining new App-host call sequence combinations from existing App-host call sequence combinations in a baseline dataset.

In some aspects, the techniques described herein relate to a method including obtaining network traffic data for a period of time, the network traffic data including a plurality of host calls; determining a host call sequence from the plurality of host calls, the host call sequence including one or more of the plurality of host calls; identifying an application corresponding to the host call sequence based on an augmented dataset; and determining a number of users of the application for the period of time based on a number of times the host call sequence repeats in the network traffic data.

In some aspects, the augmented dataset can be based on a baseline dataset generated through fingerprinting (e.g., manual or determined based on models).

In some aspects, generating the augmented dataset can further include obtaining a baseline dataset including a plurality of first host calls; normalizing the baseline dataset by modifying at least one of the plurality of first host calls; obtaining interaction data including a plurality second host calls; normalizing the interaction data by modifying at least one of the plurality of second host calls; determining interchangeable host calls from the normalized baseline dataset and the normalized interaction data by matching the modified at least one of the plurality of first host calls with the modified at least one of the plurality of second host calls;

and generating the augmented dataset based on the baseline dataset and the determined interchangeable host calls.

In some aspects, modifying at least one of the plurality of first host calls and at least one of the plurality of second host calls can further include extracting one or more parameters of the host calls and removing any of remaining parameters.

In some aspects, matching the modified at least one of the plurality of first host calls with the modified at least one of the plurality of second host calls can further include determining a host interchangeability score.

In some aspects, determining the host interchangeability score can further include calculating a similarity (e.g., cosine similarity or the like) between word embedding vectors corresponding to the modified at least one of the plurality of first host calls and the modified at least one of the plurality of second host calls.

In some aspects, generating the augmented dataset can further include obtaining a baseline dataset including an application-host call sequence combination, the application-host call sequence combination including an application and a corresponding first host call sequence, the first host call sequence including a first host call; determining a predicted host call from the first host calls using a host interchangeability model; and generating a new application-host call sequence combination including the application and a second host call sequence, the second host call sequence including the second host call.

In some aspects, the techniques described herein relate to a non-transitory computer-readable storage medium for storing instructions executable by a processor, the instructions comprising obtaining network traffic data for a period of time, the network traffic data including a plurality of host calls; determining a host call sequence from the plurality of host calls, the host call sequence including one or more of the plurality of host calls; identifying an application corresponding to the host call sequence based on an augmented dataset; and determining a number of users of the application for the period of time based on a number of times the host call sequence repeats in the network traffic data.

In some aspects, the techniques described herein relate to a device comprising a processor configured to obtain network traffic data for a period of time, the network traffic data including a plurality of host calls; determine a host call sequence from the plurality of host calls, the host call sequence including one or more of the plurality of host calls; identify an application corresponding to the host call sequence based on an augmented dataset; and determine a number of users of the application for the period of time based on a number of times the host call sequence repeats in the network traffic data.

FIG. 1 is a block diagram illustrating an example environment within which the systems and methods disclosed herein could be implemented according to some embodiments.

FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 can include user equipment (UE) 102-104, network 106, host servers 108-110, traffic monitoring server 112, and traffic database 114.

In the illustrated embodiment, UE 102-104 can communicate with host servers 108-110 via network 106. In some embodiments, UE 102-104 can include virtually any computing device capable of communicating with other UE, devices, or servers over a network, such as network 106. In some embodiments, UE 102-104 may be capable of sending or receiving signals, such as via a wired or wireless network, or may be capable of processing or storing signals, such as in memory as physical memory states. As examples, UE 102-104 can include mobile phones, smart devices, tablets, laptops, sensors, IoT devices, autonomous machines, unmanned aerial vehicles (UAVs), wired devices, wireless handsets, and any other devices equipped with a cellular or wireless or wired transceiver, whether portable or non-portable. In some embodiments, UE 102-104 can also be described generally as client devices. In some embodiments, UE 102-104 can be devices 700 as described with respect to FIG. 7.

In some embodiments, UE 102-104 can include at least one client application or program that is configured to communicate with a host sever, such as, host servers 108-110. In some embodiments, the client application can include a capability to provide and receive textual content, graphical content, audio content, and the like. In some embodiments, the client application can further provide information that identifies itself and/or the UE including a type, capability, name, and the like. In some embodiments, UE 102-104 can transmit host calls to other devices, such as host servers 108-110. In some embodiments, host calls transmitted from UE 102-104 can include one or more host call parameters.

According to some embodiments, network 106 can be configured to couple UE 102-104, host servers 108-110, and/or traffic monitoring server 112. In some embodiments, network 106 can be a wired network, a wireless network, or a combination thereof. In some embodiments, network 106 is enabled to employ any form of computer readable media or network for communicating information from one electronic device to another. In some embodiments, network 106 can include the Internet, a local area network (LAN), a wireless LAN, a wide area network (WAN), a mobile edge computing (MEC) network, a private network, a cellular network, and the like. According to some embodiments, a "network" should be understood to refer to a network that may couple devices so that communications may be exchanged (e.g., between a server and a client device) including between wireless devices coupled via a wireless network, for example. In some embodiments, a network can also include mass storage or other forms of computer or machine readable media (e.g., traffic database 114), for example.

In some embodiments, network 106 can include an access network and/or core network (not shown) of a mobile network. In general, the access network can include at least one base station that is communicatively coupled to the core network and coupled to zero or more UE 102-104. In some embodiments, the access network can comprise a cellular access network, for example, a fifth-generation (5G) network or a fourth-generation (4G) network. In one embodiment, the access network can comprise a NextGen Radio Access Network (NG-RAN), which can be communicatively coupled to UE 102-104. In an embodiment, the access network can include a plurality of base stations (e.g., eNodeB (eNB), gNodeB (gNB)) communicatively connected to UE 102-104 via an air interface. In some embodiments, the air interface can comprise a New Radio (NR) air interface. For example, in some embodiments, in a 5G network, UE 102-104, host servers 108-110, and/or traffic monitoring server 112 can be communicatively coupled to each other and to other devices. And, in some embodiments, for example, such coupling can be via Wi-Fi functionality, Bluetooth, or other forms of spectrum technologies, and the like.

In some embodiments, the access network and/or core network may be owned and/or operated by a service provider or an NO and provides wireless connectivity to UE 102-104 via the access network. In some embodiments, the core network can be communicatively coupled to a data network. In some embodiments, the data network can include one or more host servers 108-110. In some embodiments, network 106 can include one or more network elements. In some embodiments, network elements may be physical elements such as router, servers and switches or may be virtual Network Functions (NFs) implemented on physical elements.

According to some embodiments, host servers 108-110 and/or traffic monitoring server 112 can be capable of sending or receiving signals, such as via a wired or wireless network (e.g., network 106), or may be capable of processing or storing signals, such as in memory as physical memory states. In some embodiments, host servers 108-110, traffic monitoring server 112 can store, obtain, retrieve, transform, or provide content and/or content data in any form, known or to be known, without departing from the present disclosure.

As used herein, a "server" should be understood to refer to a service point which provides processing, database, and communication facilities. In some embodiments, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

According to some embodiments, devices capable of operating as a server (e.g., host servers 108-110 or traffic monitoring server 112) may include, as examples, dedicated rack-mounted servers, desktop computers, laptop computers, set top boxes, integrated devices combining various features, such as two or more features of the foregoing devices, or the like. In some embodiments, host servers 108-110 and/or traffic monitoring server 112 can be devices 700 as described with respect to FIG. 7.

Moreover, although FIG. 1 illustrates host servers 108-110 and traffic monitoring server 112 as single computing devices, respectively, the disclosure is not so limited. For example, one or more functions of host server host servers 108-110 and/or traffic monitoring server 112 can be distributed across one or more distinct computing devices.

In some embodiments, host servers 108-110 can include a device that is configured to provide a variety of services that include, but are not limited to, email services, instant messaging (IM) services, streaming and/or downloading media services, search services, photo services, web services, social networking services, news services, third-party services, audio services, video services, advertising services, mobile application services, or the like. In some embodiments, host servers 108-110 can be referred to as application servers. In some embodiments, application servers can provide the foregoing services to a user upon the user being authenticated, verified, or identified by the service. In some embodiments, users can access services provided by host servers 108-110 via the network 106 using UE 102-104.

In some embodiments, applications, such as, but not limited to, news applications (e.g., Yahoo! Sports®, ESPN®, Huffington Post®, CNN®, and the like), mail applications (e.g., Yahoo! Mail®, Gmail®, and the like), streaming video applications (e.g., YouTube®, Netflix®, Hulu®, iTunes®, Amazon Prime®, HBO Go®, and the like), instant messaging applications, blog, photo or social networking applications (e.g., Facebook®, Twitter®, Instagram®, and the like), search applications (e.g., Yahoo!® Search), and the like, can be hosted by host servers 108-110. Thus, in some embodiments, host servers 108-110, for example, can store various types of applications and application related information including application data and user profile information (e.g., identifying and behavioral information associated with a user).

According to some embodiments, traffic monitoring server 112 can receive and analyze network traffic data corresponding to traffic through network 106. In some embodiments, the network traffic data can include data and metadata corresponding to host calls and/or host call parameters from UE 102-104. In some embodiments, data and/or metadata corresponding to host calls and/or host call parameters can include a user identifier, a timestamp, and/or a destination address. In some embodiments, the user identifier can include a username and/or a mobile phone number. In some embodiments, the destination address can include a hostname, a domain, and/or a Uniform Resource Locator (URL). In some embodiments, the timestamp can indicate when the host call was initiated by the UE, received by the traffic monitoring server 112, or received by the host servers 108-110.

In some embodiments, the host calls may be directed to host servers 108-110. In some embodiments, the host calls may not be directed to host servers 108-110. In some embodiments, the network traffic data can include responses from the host servers 108-110 to UE 102-104. In some embodiments, network traffic data can include interaction data (e.g., data from user interactions with applications implemented on user devices). In some embodiments, network traffic data can be stored in traffic database 114. In some embodiments, network traffic data can be windowed to a period of time. In some embodiments, network traffic data can be limited to a specific user or set of users. In some embodiments, traffic monitoring server 112 can be communicatively coupled with traffic database 114 to store, retrieve, and manipulate network traffic data. In some embodiments, the network traffic data can be stored directly on traffic database 114 by a network element from network 106.

Figure 2:
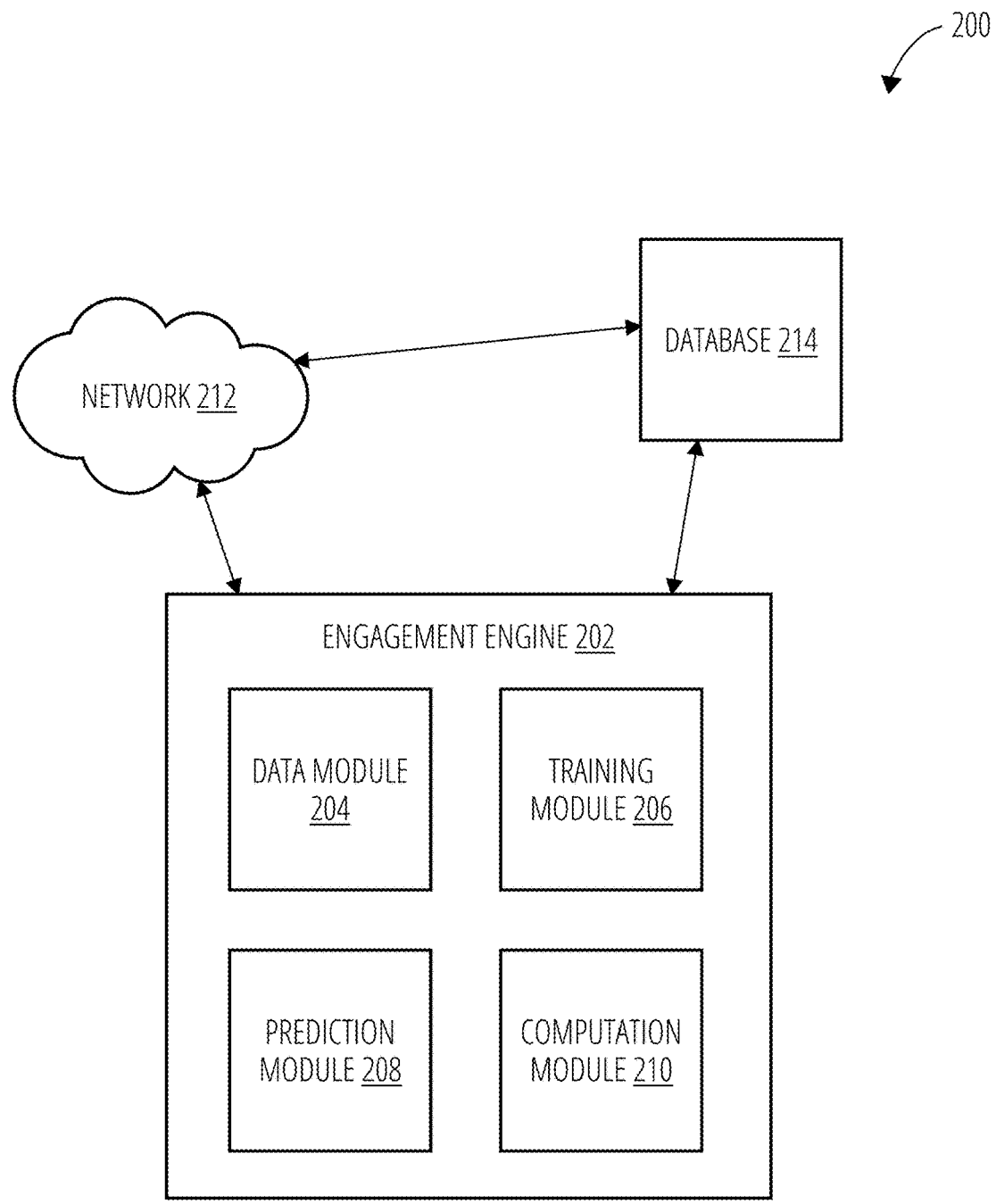
FIG. 2 is a block diagram illustrating components of a notification system according to some embodiments.

FIG. 2 is a block diagram illustrating components of a notification system according to some embodiments.

According to some embodiments, engagement system 200 can include engagement engine 202, network 212, and database 214. In some embodiments, engagement engine 202 can be a special purpose machine or processor and could be hosted by a cloud server (e.g., cloud web services server(s)), messaging server, application server, content server, social networking server, web server, search server, content provider, third party server, user's computing device, and the like, or any combination thereof. In some embodiments, engagement engine 202 can be hosted by traffic monitoring server 112 as discussed in relation to FIG. 1.

Figure 7:
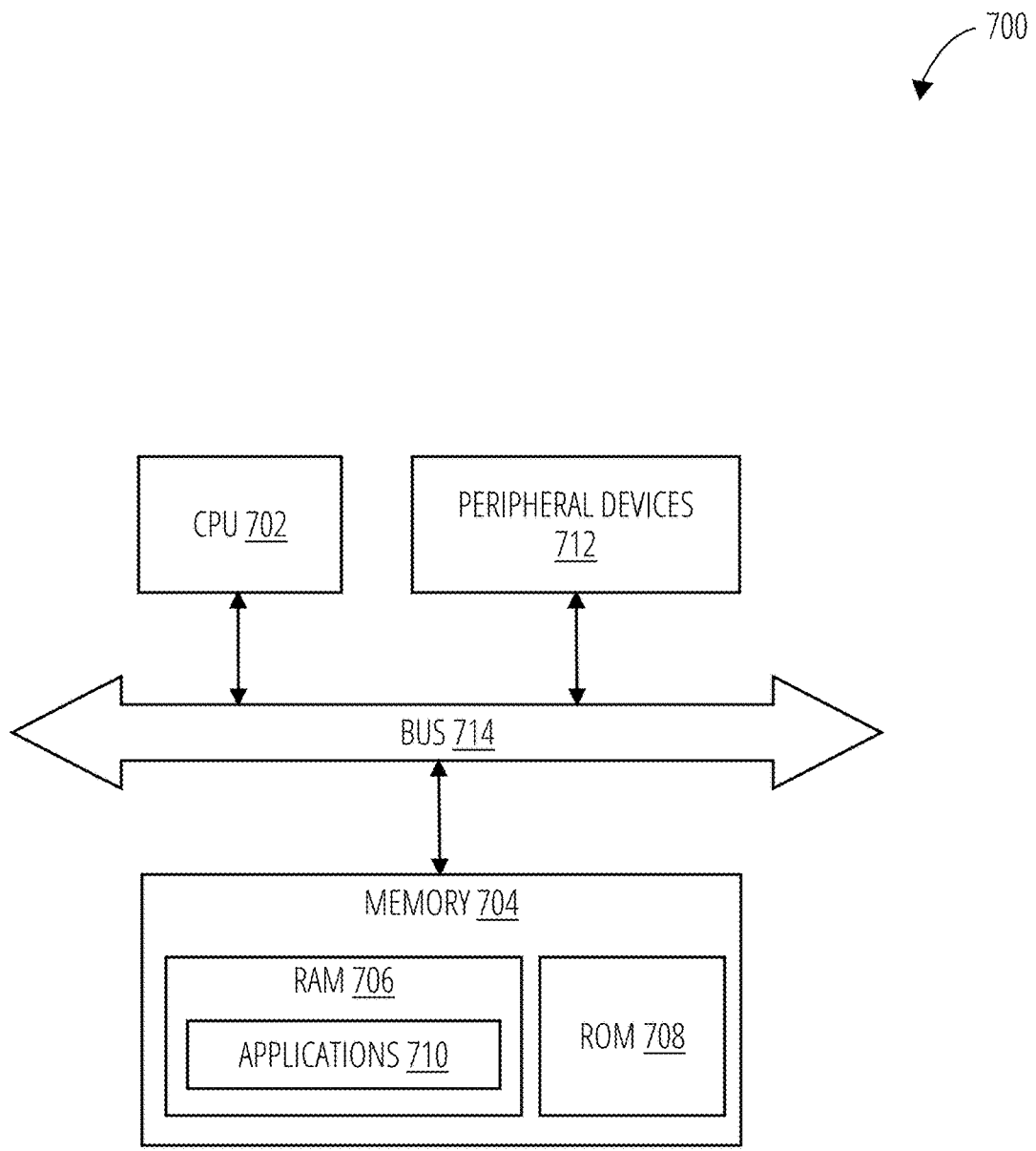
FIG. 7 is a block diagram of a device according to some embodiments.

According to some embodiments, engagement engine 202 can be a stand-alone application that executes on a computing device (e.g., device 700 from FIG. 7). In some embodiments, engagement engine 202 can function as an application installed on the computing device, and in some embodiments, such an application can be a web-based application accessed by the computing device over a network. In some embodiments, portions of the engagement engine 202 function as an application installed on the computing device and some other portions can be cloud-based or web-based applications accessed by the computing device over a network (e.g., network 212), where the several portions of the engagement engine 202 exchange information over the network. In some embodiments, the engagement engine 202 can be installed as an augmenting script, program or application (e.g., a plug-in or extension) to another application or portable data structure.

In some embodiments, the database 214 can be any type of database or memory, and can be associated with a content server or an application server on a network or a computing device. In some embodiments, portions of database 214 can be included in traffic database 114 and vice versa. In some embodiments, database 214 can include traffic network data. In some embodiments, database 214 can include traffic network data comprising interaction data. In some embodiments, database 214 can include a baseline dataset. In some embodiments, a baseline dataset can include data and/or metadata associated with users, devices, applications, host calls, host call parameters, App-host call sequences, and host servers. In some embodiments, database 214 can include an augmented dataset. In some embodiments, the augmented dataset can include data and/or metadata associated with users, devices, applications, host calls, host call parameters, App-host call sequences, and host servers. In some embodiments, such information can be stored and indexed in the database 214 independently and/or as a linked or associated dataset (e.g., using unique identifiers). For example, in some embodiments, users, devices, Apps, host calls, host call parameters, host servers, and/or App-host call sequences can be linked using respective unique identifiers.

According to some embodiments, database 214 can store data and metadata associated with messages, images, videos, text, products, documents, items and services from an assortment of media, applications and/or service providers and/or platforms, network traffic, and the like. Accordingly, any other type of known or to be known attribute or feature associated with a record, request, data item, media item, website, application, communication (e.g., a host call) and/or its transmission over a network (e.g., network traffic), content included therein, or some combination thereof, can be saved as part of the data/metadata in database 214.

According to some embodiments, network 212 can be any type of network such as, but not limited to, a wireless network, a local area network (LAN), wide area network (WAN), the Internet, or a combination thereof. In some embodiments, network 212 can facilitate connectivity of the engagement engine 202, and the database 214. Indeed, as illustrated in FIG. 2, the engagement engine 202 and database 214 can be directly connected by any known or to be known method of connecting and/or enabling communication between such devices and resources. In some embodiments, network 212 can include some or all the elements of network 106 as discussed in relation to FIG. 1.

The principal processor, server, or combination of devices that comprise hardware programmed in accordance with the special purpose functions herein is referred to for convenience as engagement engine 202, and includes data module 204, training module 206, prediction module 208, and computation module 210. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 3:
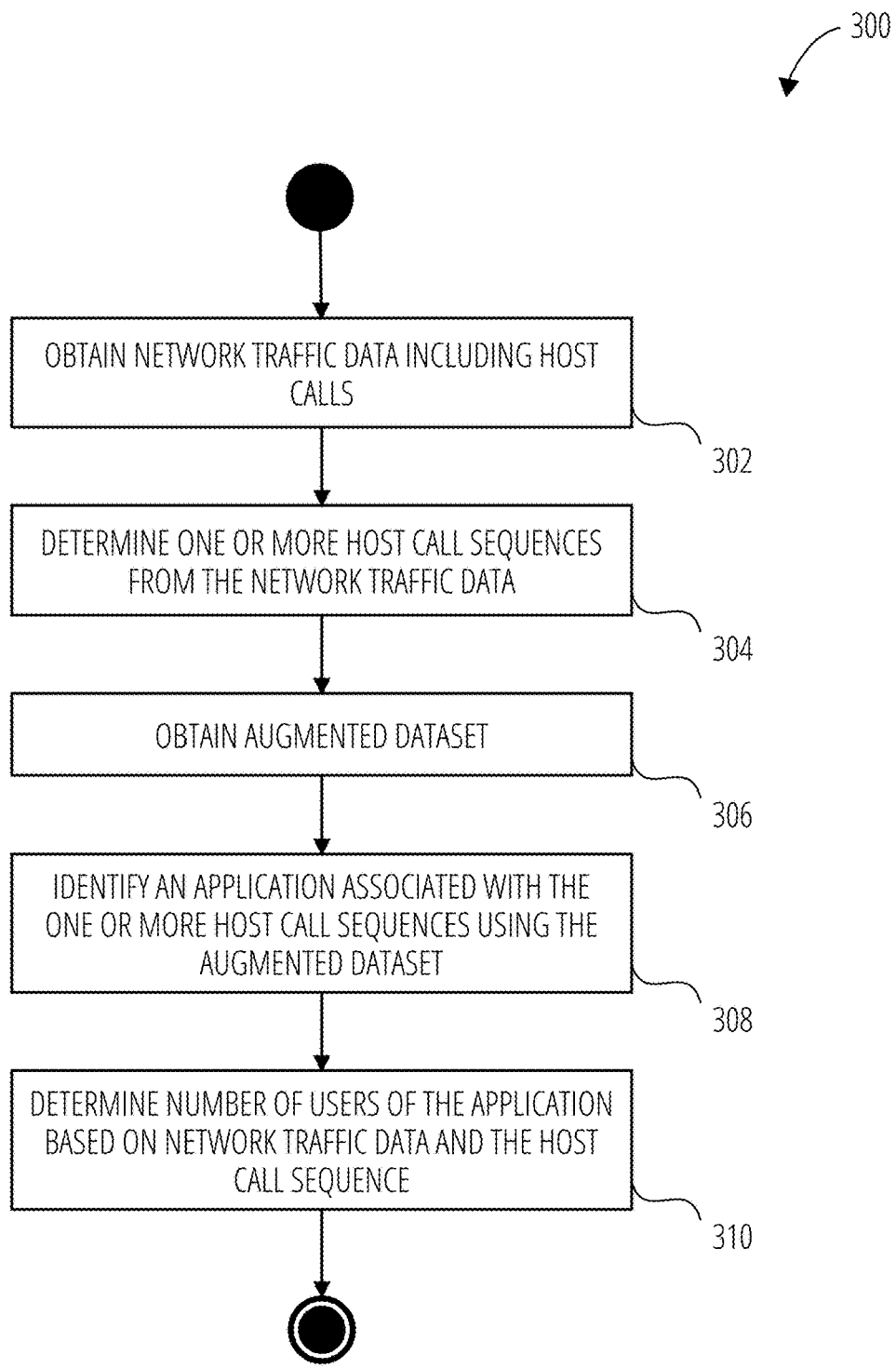
FIG. 3 is a flow diagram illustrating a method for determining user engagement with an application according to an embodiment.

FIG. 3 is a flow diagram illustrating a method for determining user engagement with an application according to an embodiment.

According to some embodiments, method 300 can be performed by engagement engine 202. In some embodiments, Steps 302-308 can be performed by data module 204 and Step 310 can be performed by computation module 210.

In Step 302, method 300 can include obtaining network traffic data. In some embodiments, the network traffic data can include data and/or metadata corresponding to host calls and/or host call parameters. In some embodiments, the host calls can correspond to host calls from applications implemented in UE to host servers (e.g., UE 102-104 to host servers 108-110 as discussed in relation to FIG. 1). In some embodiments, the network traffic data can be obtained from a database as described herein. For example, in some embodiments, in Step 302, data module 204 can communicate with database 214 to obtain the network traffic data. In some embodiments, data module 204 can communicate with some other device through network 212 to obtain the network traffic data.

In some embodiments, the network traffic data can be limited to a predetermined period of time. In some embodiments, the period of time can be minutes, hours, days, months, or years. In some embodiments, the network traffic data can include host calls recorded over a period of time. In some embodiments, the network traffic data can be filtered by hostnames or domains, specific devices, specific users, types of users, other host call parameters, or a combination thereof.

In Step 304, method 300 can include determining one or more host call sequences from the network traffic data. In some embodiments, a host call sequence can include one or more host calls. In some embodiments, the number of host calls in a host call sequence can be predetermined (e.g., 1, 3, 5, 10, 105, 1000, etc.). In some embodiments, host call sequences in network traffic data can be delineated using a temporal parameter. For example, in some embodiments, if a certain amount of time has passed between a first host call and a second host call then a first call host sequence ends with the first host call and a second host call sequence begins with the second host call. In some embodiments, a host call sequence can be determined from both a temporal parameter and a predetermined number of host calls in a sequence. In some embodiments, the period of time between host calls used for delineating sequences can be arbitrary (e.g., seconds, minutes, hours). In some embodiments, the period of time between host calls used for delineating sequences can be experimentally determined. In some embodiments, the period of time between host calls used for delineating sequences can be 5 minutes.

In some embodiments, data module 204 can determine host call sequences including one or more host calls. In some embodiments, data module 204 can parse the network traffic data using text processing techniques to identify the host calls in the traffic network data. In some embodiments, text processing techniques can include any text processing techniques used for extracting information from structured or unstructured data, known or to be known, without departing from the present disclosure. In some embodiments, text processing techniques can include regular expressions, tokenization, comma-separated values (CSV) parsing, extensible Markup Language (XML) parsing, JavaScript Object Notation (JSON) parsing, and the like.

In some embodiments, in Step 304, method 300 can include performing a normalization operation on the data and/or metadata of the host calls and/or host call parameters in the network traffic data. For example, in some embodiments, a host call can include a plurality of parameters or arguments. In some embodiments, the normalization operation can include extracting one or more parameters or arguments from the host call to generate a modified host call. In those embodiments, a modified version of the network traffic data (e.g., modified network traffic data) including the modified host calls can be generated. According to some embodiments, the remaining steps of method 300 can be performed using the received network traffic data or the modified network traffic data.

As an example of a pre-processing operation in some embodiments, a host call including a first set of arguments and a second set of arguments (where the second set of arguments can include a hostname or a domain name): a---bc-xxx.sampledomain.com can be processed to extract the first set of arguments: "a---bc-" and the second set of arguments: "xxx.sampledomain.com." Then, in some embodiments, the modified host call can include the second set of arguments (xxx.sampledomain.com) but not the first set of arguments. In some embodiments, the modified host call can include a portion of a set of arguments of the host call. Continuing with the example above, in some embodiments, modified host call can include a portion of the second set of arguments (in this example, the base domain): sampledomain.com.

In some embodiments, the host call sequences can have overlapping host calls. For example, in an embodiment, the traffic network data can include host calls A, B, C, D, and E. In Step 304, data module 204 can identify a first host call sequence including host calls A, B, and C; a second host call sequence including host calls B, C, and D; and a third host call sequence including host calls C, D, and E.

In Step 306, method 300 can include obtaining an augmented dataset. In some embodiments, the augmented dataset can include App-host call sequence combinations. In some embodiments, the augmented dataset can be an augmented dataset generated as discussed in relation to FIG. 4 and FIG. 5. In some embodiments, the augmented dataset can be obtained from a database as described herein. For example, in some embodiments, in Step 306, data module 204 can communicate with database 214 to obtain the augmented dataset. In some embodiments, data module 204 can communicate with some other device through network 212 to obtain the augmented dataset.

In Step 308, method 300 can include identifying and applications from the one or more host call sequences identified in Step 304. In some embodiments, identifying the application can include performing a table look-up operation to determine if there is a matching application for an input host call sequence (e.g., determined in Step 304) in the augmented dataset. In some embodiments, identifying the one or more applications can include matching the one or more host call sequences with host call sequences in the augmented dataset and determining the applications corresponding to the matched host call sequences.

In some embodiments, in Step 308, data module 204 can implement one or more database searching techniques to determine an application in an augmented dataset from an input host call sequence. For example, in some embodiments, a database searching technique can include direct lookup, full-text search, index search, hash search, or a combination thereof.

In Step 310, method 300 can include determining a number of user for the identified application. In some embodiments, determining the number of users can include determining the number of times the one or more host call sequences matching the application appear in the network traffic data (or the modified network traffic data). In some embodiments, where the network traffic data is confined to a period of time, the determined number of users can correspond to the number of users using the application for the period of time.

Figure 4:
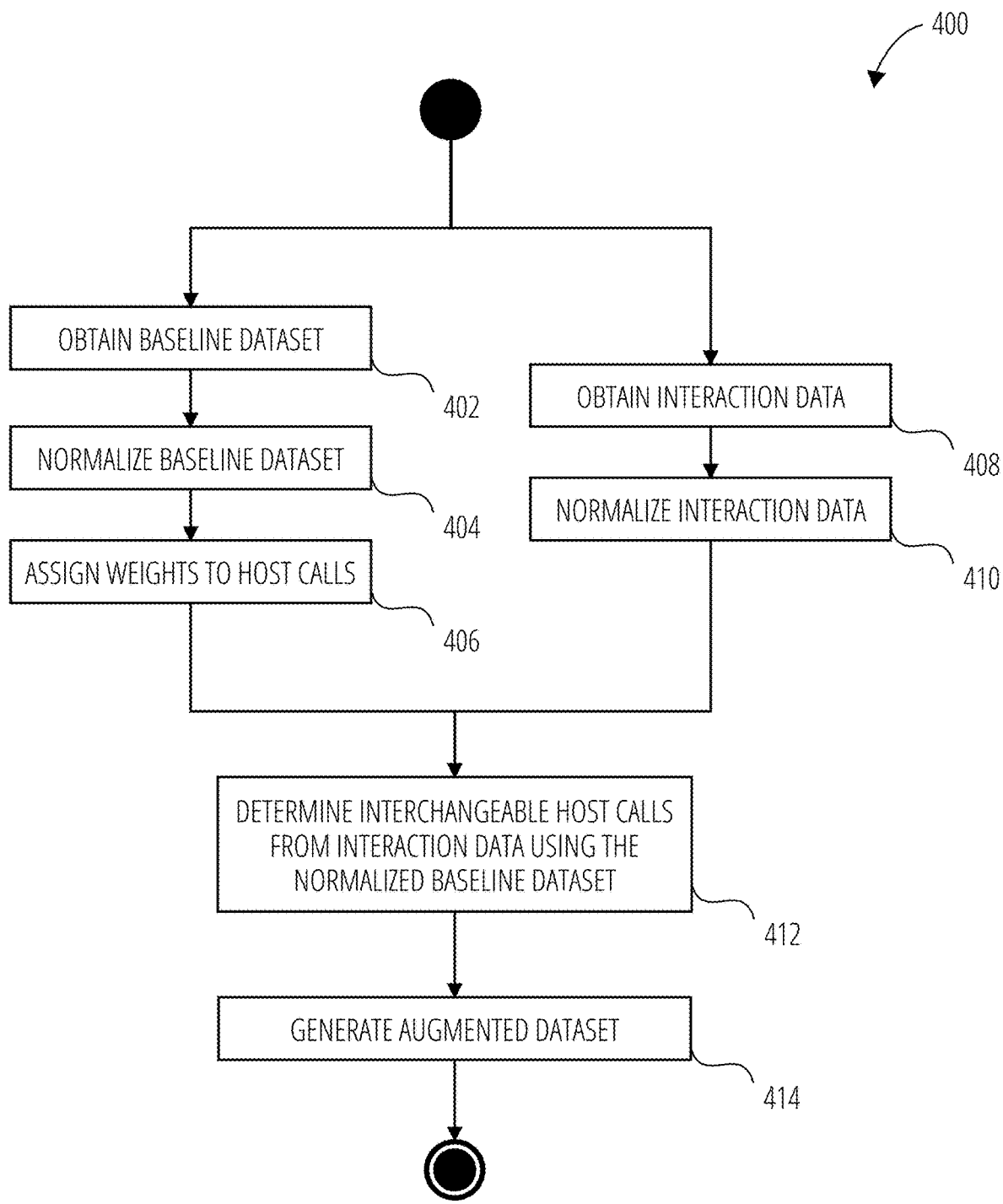
FIG. 4 is a flow diagram illustrating a method for generating an augmented dataset according to an embodiment.

FIG. 4 is a flow diagram illustrating a method for generating an augmented dataset according to an embodiment.

According to some embodiments, method 400 can be performed by engagement engine 202. In some embodiments, Steps 402, 404, 408, and 410 can be performed by data module 204 and Steps 406, 412, and 414 can be performed by computation module 210.

In Step 402, method 400 can include obtaining, by data module 204 from database 214, a baseline dataset of App-host call sequence combinations. In some embodiments, the baseline dataset can be generated through fingerprinting as discussed herein.

In Step 404, method 400 can include normalizing, by data module 204, the baseline dataset. In some embodiments, normalizing the baseline dataset can include a normalization operation as discussed in relation to Step 304 of FIG. 3. In some embodiments, to normalize the baseline dataset, one or more host calls in the baseline dataset can be modified to extract one or more parameters or arguments from the host call to generate a modified host call. For example, in some embodiments, the extracted parameter or argument can be a domain included in the host call. Then, in some embodiments, data module 204 can generate a normalized baseline dataset based on the modified host calls.

In Step 406, method 400 can include applying, by computation module 210, a statistical analysis technique to assign weights to each of the modified host calls. In some embodiments, the assigned weights can indicate which host calls are most indicative of a corresponding application. In some embodiments, the statistical analysis technique can be term frequency-inverse document frequency (TF-IDF).

In Step 408, method 400 can include obtaining, by data module 204 from database 214, interaction data. In some embodiments, the interaction data can correspond to network traffic data for a given user or set of users. In some embodiments, the interaction data can correspond to network traffic data for a given period of time. In some embodiments, interaction data can include data and/or metadata corresponding to a host call and/or host call parameters. In some embodiments, interaction data can include a user identifier and/or a timestamp.

In Step 410, method 400 can include normalizing, by data module 204, the host calls in the interaction data to create normalized interaction data. In some embodiments, to normalize the interaction data, one or more host calls in the interaction data can be modified to extract one or more parameters or arguments from the host call to generate a modified host call. For example, in some embodiments, the extracted parameter or argument can be a domain included in the host call. Then, in some embodiments, data module 204 can generate the normalized interaction data based on the modified host calls.

In Step 412, method 400 can include determining, by computation module 210, interchangeable hosts by matching the modified host calls from the normalized interaction data with the modified host calls from the baseline dataset. In some embodiments, the interchangeable hosts can be determined based on calculating a host interchangeability score as described in reference to FIG. 6.

In Step 414, method 400 can include generating, by computation module 210, an augmented dataset based on the baseline dataset and the modified host calls from the modified interaction data with a host call host interchangeability score above a threshold. In some embodiments, the augmented dataset includes all or a portion of the baseline dataset. In some embodiments, generating the augmented dataset includes adding new App-host call sequence combinations including the modified host calls from the modified interaction data and the corresponding application of the modified host call from the baseline dataset with a host interchangeability score meeting a threshold.

Figure 5:
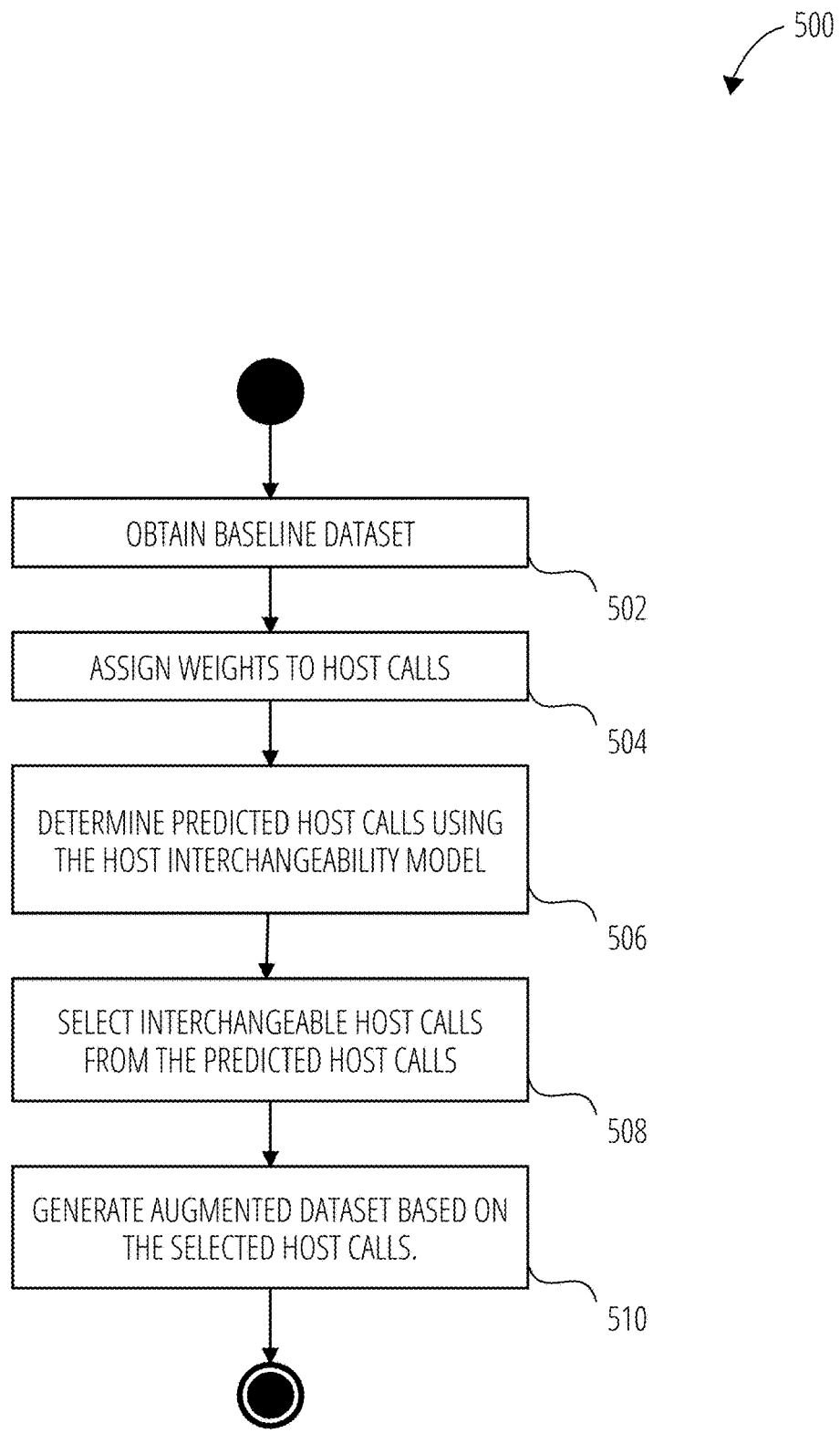
FIG. 5 is a flow diagram illustrating a method for generating an augmented dataset according to an embodiment.

FIG. 5 is a flow diagram illustrating a method for generating an augmented dataset according to an embodiment.

According to some embodiments, method 500 can be performed by engagement engine 202. In some embodiments, Step 502 can be performed by data module 204 and Steps 504-510 can be performed by computation module 210.

In Step 502, method 500 can include obtaining, by data module 204 from database 214, a baseline dataset of App-host call sequence combinations. In some embodiments, the baseline dataset can be generated through fingerprinting as discussed herein.

In Step 504, method 500 can include applying, by computation module 210, a statistical analysis technique to assign weights to each of the host calls in the baseline dataset. In some embodiments, the assigned weights can indicate which host calls are most indicative of a corresponding application. In some embodiments, the statistical analysis technique can be term frequency-inverse document frequency (TF-IDF). In some embodiments, the host calls of the baseline dataset can be modified host calls of a modified baseline dataset as discussed herein.

In Step 506, method 500 can include determining, by computation module 210, using a host interchangeability model (as described in reference to FIG. 6) one or more predicted host calls based on the host call sequences in the baseline dataset including a host call with an assigned weight above a threshold. In some embodiments, the threshold can be arbitrarily determined (e.g., top 10%, top 20 host calls).

In Step 508, method 500 can include selecting, by computation module 210, from the predicted host calls, the host calls with a probability of being interchangeable with the host call in the host call sequence in the baseline dataset above a threshold. In some embodiments, the selected host call has the highest probability. the threshold can be arbitrarily determined (e.g., top 10%, top 20 host calls).

In Step 510, method 500 can include generating, by computation module 210, an augmented dataset based on the baseline dataset and the selected interchangeable host calls. In some embodiments, the augmented dataset includes a portion or all of the baseline dataset. In some embodiments, generating the augmented dataset includes adding new App-host call sequence combinations determined by replacing the host calls in a host call sequence with a corresponding selected host call sequence.

Figure 6:
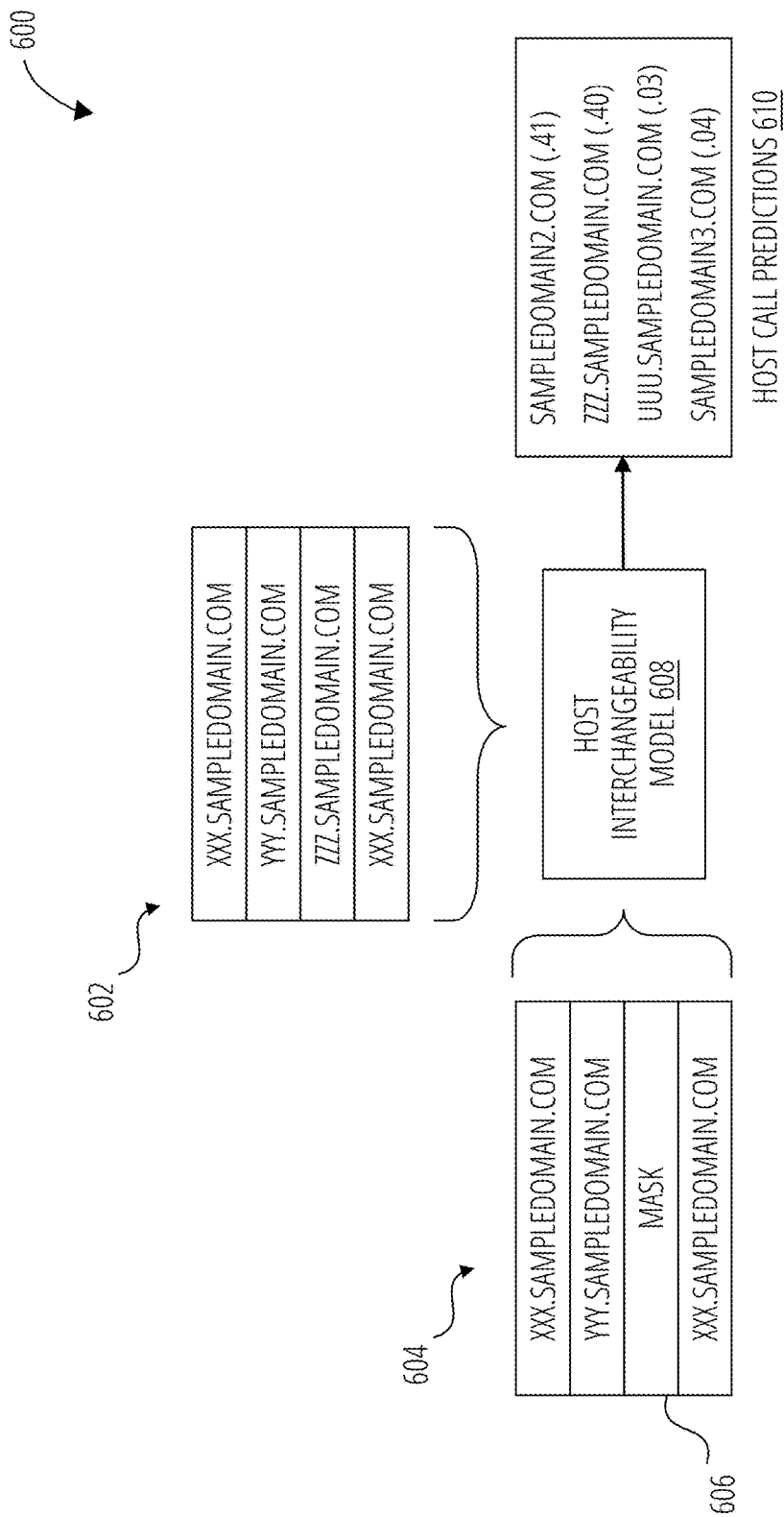
FIG. 6 is a flow diagram illustrating a method for training a host interchangeability model according to an embodiment.

FIG. 6 is a flow diagram illustrating a method for training a host interchangeability model according to an embodiment.

According to some embodiments, method 600 can include retrieving, by data module 204 from database 214, a training dataset of reference host call sequences. In some embodiments, the training dataset can include a plurality of host call sequences. In some embodiments, the training dataset can be derived from traffic network data. In some embodiments, the training dataset can be derived from traffic network data of a single user or a set of users from a global corpus of network traffic data. In some embodiments, the training dataset can be derived from the network traffic data corresponding to a specific period of time (e.g., hours, days, months). In some embodiments, the training dataset can include a plurality of reference sequences 602.

In some embodiments, method 600 can include identifying, by data module 204, a reference sequence 602 and then generating a masked sequence 604 by masking one or more host calls from the reference sequence 602. As used herein, masking refers to the process of removing or tokenizing an item from a sequence. In some embodiments, the host call to be masked (e.g., a reference host call) can be randomly selected from the reference sequence 602. In some embodiments, the host call to be masked can be the last host call in the reference sequence 602. In some embodiments, method 600 can include masking a plurality of host calls in the reference sequence 602. In some embodiments, the resulting masked sequence 604 can include a mask 606 representing the removed host call sequence.

In some embodiments, method 600 can include inputting, by training module 206, the masked sequence 604 into the host interchangeability model 608 and outputting host call predictions 610. In some embodiments, the host call predictions 610 can include a plurality of candidate host calls and a probability for each candidate. In some embodiments, the probabilities can indicate a likelihood that the candidate host call is the reference host call. In some embodiments, a host interchangeability model can be a sequence model. In some embodiments, a sequence model can be a type of machine learning model that is designed to process sequential data, such as sequential (or chronologically ordered) host calls. In some embodiments, a host interchangeability model can include recurrent neural networks (RNNs), long short-term memory (LSTM) networks, transformer models, sequence-to-sequence (Seq2Seq) models, and the like.

In some embodiments, method 600 can include optimizing, by training module 206, the host interchangeability model 608. In some embodiments, method 600 can include replacing the masked host call 606 in the masked sequence 604 with the candidate host call with the highest probability to generate a predicted host call sequence. Then, in some embodiments, method 600 can include comparing the reference sequence 602 to the predicted host call sequence and optimizing host interchangeability model 608 (e.g., by updating one or more parameters (e.g., weights) of the model) based on a similarity (e.g., as calculated by a loss function) between the reference sequence 602 to the predicted host call sequence.

At runtime, in some embodiments, prediction module 208 can use host interchangeability model 608 to determine a predicted host call with the highest likelihood of interchangeability with a reference host call.

In some embodiments, prediction module 208 can use host interchangeability model 608 to determine a host interchangeability score for a given candidate host call when compared to a reference host call. In some embodiments, host interchangeability score can indicate that a candidate host call usually appears in the same context (similar sequences of host calls) as the reference host call.

In some embodiments, the host interchangeability score can be represented by

Equation 1
$$\frac{\sum P_{model}(a \mid b \text{ is correct}) + \sum P_{model}(b \mid a \text{ is correct})}{\sum P_{model}(a \text{ or } b \mid a \text{ is correct}) + \sum P_{model}(a \text{ or } b \mid b \text{ is correct})}$$

Where a and b represent predicted host call (e.g., a candidate host call with the highest probability) and a reference host call. In some embodiments, the numerator of Equation 1 corresponds to the number of times a predicted host call was not interchangeable with the reference host call and the denominator represents all the times a and b were compared.

In some embodiments, the lower the resulting host interchangeability score the higher the likelihood that the candidate host call is used in the same context as the reference host call. In some embodiments, whether two host calls are interchangeable is based on whether the host interchangeability score meets a predetermined threshold. In some embodiments, the predetermined threshold can be between 0.1-0.3. In some embodiments, the predetermined threshold can be experimentally determined.

According to some embodiments, method 600 can include determining, by prediction module 208, the host interchangeability score based on a mathematical similarity between word embedding vectors. In some embodiments, determining the host interchangeability score can be based on a cosine similarity between word embedding vectors. For example, in some embodiments, a plurality of word embeddings can be determined by passing one or more host call sequences to a word embedding algorithm, such as word2vec. In some embodiments, this algorithm can produce a lookup table from word (e.g., host calls) to embedding. Then, in some embodiments, the host interchangeability score of two host calls can be calculated as the cosine similarity of the respective word embeddings.

FIG. 7 is a block diagram of a device according to some embodiments.

As illustrated, the device 700 can include a processor or central processing unit (CPU) such as CPU 702 in communication with a memory 704 via a bus 714. Device 700 can also include one or more input/output (I/O) or peripheral devices 712. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 702 can comprise a general-purpose CPU. The CPU 702 can comprise a single-core or multiple-core CPU. The CPU 702 can comprise a system-on-a-chip (SoC) or a similar embedded system. In some embodiments, a graphics processing unit (GPU) can be used in place of, or in combination with, a CPU 702. Memory 704 can comprise a non-transitory memory system including a dynamic random-access memory (DRAM), static random-access memory (SRAM), Flash (e.g., NAND Flash), or combinations thereof. In one embodiment, the bus 714 can comprise a Peripheral Component Interconnect Express (PCIe) bus. In some embodiments, bus 714 can comprise multiple busses instead of a single bus.

Memory 704 illustrates an example of non-transitory computer storage media for the storage of information such as computer-readable instructions, data structures, program modules, or other data. Memory 704 can store a basic input/output system (BIOS) in read-only memory (ROM), such as ROM 708, for controlling the low-level operation of the device. The memory can also store an operating system in random-access memory (RAM) for controlling the operation of the device Applications 710 can include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 706 by CPU 702. CPU 702 may then read the software or data from RAM 706, process them, and store them in RAM 706 again.

The device 700 can optionally communicate with a base station (not shown) or directly with another computing device. One or more network interfaces in peripheral devices 712 are sometimes referred to as a transceiver, transceiving device, or network interface card (NIC).

An audio interface in Peripheral devices 712 produces and receives audio signals such as the sound of a human voice. For example, an audio interface may be coupled to a speaker and microphone (not shown) to enable telecommunication with others or generate an audio acknowledgment for some action. Displays in Peripheral devices 712 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 712 can comprise any input device arranged to receive input from a user. An illuminator in peripheral devices 712 can provide a status indication or provide light. The device can also comprise an input/output interface in peripheral devices 712 for communication with external devices, using communication technologies, such as USB, infrared, Bluetooth™, or the like. A haptic interface in peripheral devices 712 can provide a tactile feedback to a user of the client device.

A GPS receiver in peripheral devices 712 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device can include more or fewer components than those shown in FIG. 7, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   obtaining network traffic data for a period of time, the network traffic data including a plurality of host calls;
   determining a host call sequence from the plurality of host calls, the host call sequence including one or more of the plurality of host calls;
   obtaining an augmented dataset, the augmented dataset being based on a baseline dataset generated via a process of fingerprinting;
   identifying an application corresponding to the host call sequence based on the augmented dataset; and
   determining a number of users of the application for the period of time based on a number of times the host call sequence repeats in the network traffic data.

2. The method of claim 1, further comprising generating the augmented dataset by:
   obtaining the baseline dataset including a plurality of first host calls;
   normalizing the baseline dataset by modifying at least one of the plurality of first host calls;
   obtaining interaction data including a plurality second host calls;
   normalizing the interaction data by modifying at least one of the plurality of second host calls;
   determining interchangeable host calls from the normalized baseline dataset and the normalized interaction data by matching the modified at least one of the plurality of first host calls with the modified at least one of the plurality of second host calls; and
   generating the augmented dataset based on the baseline dataset and the determined interchangeable host calls.

3. The method of claim 2, wherein modifying at least one of the plurality of first host calls and at least one of the plurality of second host calls comprises extracting one or more parameters of the host calls and removing any of remaining parameters.

4. The method of claim 2, wherein matching the modified at least one of the plurality of first host calls with the modified at least one of the plurality of second host calls comprises determining a host interchangeability score.

5. The method of claim 4, further comprising determining the host interchangeability score by calculating a similarity between word embedding vectors corresponding to the modified at least one of the plurality of first host calls and the modified at least one of the plurality of second host calls.

6. The method of claim 1, further comprising generating the augmented dataset by:
   obtaining the baseline dataset including an application-host call sequence combination, the application-host call sequence combination including an application and a corresponding first host call sequence, the first host call sequence including a first host call;
   determining a predicted host call from the first host calls using a host interchangeability model; and
   generating a new application-host call sequence combination including the application and a second host call sequence, the second host call sequence including the second host call.

7. A non-transitory computer-readable storage medium for storing instructions executable by a processor, the instructions comprising:
   obtaining network traffic data for a period of time, the network traffic data including a plurality of host calls;
   determining a host call sequence from the plurality of host calls, the host call sequence including one or more of the plurality of host calls;
   obtaining an augmented dataset, the augmented dataset being based on a baseline dataset generated via a process of fingerprinting;
   identifying an application corresponding to the host call sequence based on the augmented dataset; and
   determining a number of users of the application for the period of time based on a number of times the host call sequence repeats in the network traffic data.

8. The non-transitory computer-readable storage medium of claim 7, wherein generating the augmented dataset comprises:
   obtaining the baseline dataset including a plurality of first host calls;
   normalizing the baseline dataset by modifying at least one of the plurality of first host calls;
   obtaining interaction data including a plurality second host calls;
   normalizing the interaction data by modifying at least one of the plurality of second host calls;
   determining interchangeable host calls from the normalized baseline dataset and the normalized interaction data by matching the modified at least one of the plurality of first host calls with the modified at least one of the plurality of second host calls; and
   generating the augmented dataset based on the baseline dataset and the determined interchangeable host calls.

9. The non-transitory computer-readable storage medium of claim 8, wherein modifying at least one of the plurality of first host calls and at least one of the plurality of second host calls comprises extracting one or more parameters of the host calls and removing any remaining parameters.

10. The non-transitory computer-readable storage medium of claim 8, wherein matching the modified at least one of the plurality of first host calls with the modified at least one of the plurality of second host calls comprises determining a host interchangeability score.

11. The non-transitory computer-readable storage medium of claim 10, wherein determining the host interchangeability score comprises calculating a similarity between word embedding vectors corresponding to the modified at least one of the plurality of first host calls and the modified at least one of the plurality of second host calls.

12. The non-transitory computer-readable storage medium of claim 7, wherein generating the augmented dataset comprises:
   obtaining the baseline dataset including an application-host call sequence combination, the application-host call sequence combination including an application and a corresponding first host call sequence, the first host call sequence including a first host call;
   determining a predicted host call from the first host calls using a host interchangeability model; and generating a new application-host call sequence combination including the application and a second host call sequence, the second host call sequence including the second host call.

13. A device comprising a processor configured to:
obtain network traffic data for a period of time, the network traffic data including a plurality of host calls;
determine a host call sequence from the plurality of host calls, the host call sequence including one or more of the plurality of host calls;
obtain an augmented dataset, the augmented dataset being based on a baseline dataset generated via a process of fingerprinting;
identify an application corresponding to the host call sequence based on the augmented dataset; and
determine a number of users of the application for the period of time based on a number of times the host call sequence repeats in the network traffic data.

14. The device of claim 13, the processor further configured to generate the augmented dataset by:
obtaining the baseline dataset including a plurality of first host calls;
normalizing the baseline dataset by modifying at least one of the plurality of first host calls;
obtaining interaction data including a plurality second host calls;
normalizing the interaction data by modifying at least one of the plurality of second host calls;
determining interchangeable host calls from the normalized baseline dataset and the normalized interaction data by matching the modified at least one of the plurality of first host calls with the modified at least one of the plurality of second host calls; and
generating the augmented dataset based on the baseline dataset and the determined interchangeable host calls.

15. The device of claim 14, the processor further configured to modify at least one of the plurality of first host calls and at least one of the plurality of second host calls by extracting one or more parameters of the host calls and removing any of remaining parameters.

16. The device of claim 14, the processor further configured to match the modified at least one of the plurality of first host calls with the modified at least one of the plurality of second host calls by determining a host interchangeability score; the processor further configured to determine the host interchangeability score by calculating a similarity between word embedding vectors corresponding to the modified at least one of the plurality of first host calls and the modified at least one of the plurality of second host calls.

17. The device of claim 13, the processor further configured to generate the augmented dataset by:
obtaining the baseline dataset including an application-host call sequence combination, the application-host call sequence combination including an application and a corresponding first host call sequence, the first host call sequence including a first host call;
determining a predicted host call from the first host calls using a host interchangeability model; and
generating a new application-host call sequence combination including the application and a second host call sequence, the second host call sequence including the second host call.

* * * * *